United States Patent
Chew et al.

(10) Patent No.: US 7,260,330 B2
(45) Date of Patent: Aug. 21, 2007

(54) OPTICAL COMMUNICATION SYSTEM USING CORRELATION RECEIVER

(75) Inventors: Wilbert Chew, Cerritos, CA (US); Rickey D. Jimerson, Inglewood, CA (US)

(73) Assignee: The Boeing Company, Chicago, IL (US)

( * ) Notice: Subject to any disclaimer, the term of this patent is extended or adjusted under 35 U.S.C. 154(b) by 1104 days.

(21) Appl. No.: 10/288,167

(22) Filed: Nov. 4, 2002

(65) Prior Publication Data

US 2004/0213579 A1   Oct. 28, 2004

(51) Int. Cl.
    *H04B 10/00*   (2006.01)
(52) U.S. Cl. ....................... 398/154; 398/208
(58) Field of Classification Search ................ 395/154, 395/155, 208
    See application file for complete search history.

(56) References Cited

U.S. PATENT DOCUMENTS

| | | | |
|---|---|---|---|
| 5,285,305 A | 2/1994 | Cohen | |
| 6,175,433 B1 * | 1/2001 | Patel et al. | 398/154 |
| 6,404,528 B1 | 6/2002 | Pfeiffer | |
| 6,421,483 B1 | 7/2002 | Hajjar | |
| 6,826,371 B1 * | 11/2004 | Bauch et al. | 398/188 |
| 7,130,545 B2 * | 10/2006 | Lou et al. | 398/198 |
| 2003/0007216 A1 * | 1/2003 | Chraplyvy et al. | 359/161 |

* cited by examiner

*Primary Examiner*—Christina Leung
(74) *Attorney, Agent, or Firm*—Ingrassia Fisher & Lorenz, P.C.

(57) ABSTRACT

The present invention provides for a system and method for an optical communication system that utilizes an optical modulator as an optical correlator in a receiver. The present invention may be used as a correlator in a receiver for an On-Off Keying (OOK) system or for a Differential Phase Shift Keying (DPSK) system. A correlation modulator is followed by a low pass filter, which together act as a correlator to determine the correlation of the received waveform with possible transmitted waveforms to produce a maximized signal-noise ratio. The result is a high data rate communication system and method that approaches the theoretical performance limit.

46 Claims, 5 Drawing Sheets

OPTICAL COMMUNICATION SYSTEM USING CORRELATION RECEIVER

BACKGROUND OF THE INVENTION

The present invention generally relates to communication systems, and more particularly, to a high-data-rate optical communication system.

The need for high-performance optical communication techniques has become more apparent with the move towards ultra-high-speed 100-Gbps-class all-optical networks. High-sensitivity optical communication links are vital for the design of future high-performance communication networks. For highest sensitivity, it is usual to attempt to match the receiver response to the transmitted waveform. Sensitive receiver performance reduces transmitter or midspan amplifier requirements, extends link distances, and provides additional margin. This is especially beneficial for free space communications since improvement in receiver sensitivity directly reduces transmitted power requirements.

Communication engineers generally strive to match the receiver response to the transmitted waveform in order to maximize the signal-to-noise ratio (S/N or SNR). This is usually accomplished using a filter which determines the response of the receiver. A filter with a response that is matched to the transmitted waveform is called a matched filter, and maximizes the SNR when the noise is additive white noise. Other methods are known within the art. In radio-frequency systems, an alternative to using a matched filter in the receiver is to use a correlation receiver to maximize SNR; in theory, a correlation receiver can achieve the same SNR as a receiver using a matched filter. The present invention is an optical implementation of a correlation receiver. The SNR also can be increased by providing a higher level of signal output power from the transmitter, if higher power is available.

There has been the desire to achieve the theoretical performance limit. The theoretical performance limit for sensitivity varies according to the system being used, and may be expressed as the energy per bit or the number of photons per bit required to achieve a specified bit error rate (BER). By way of example, the theoretical performance limit for the sensitivity of a Differential Phase Shift Keying (DPSK) system using an optical pre-amplifier may be near 20 photons per bit if the sensitivity is defined for a bit error rate of 1 per billion or 1/1,000,000,000. The theoretical performance limit for an On-Off Keying (OOK) system using an optical pre-amplifier may be 38 photons per bit if the sensitivity is defined for a bit error rate of 1 per billion or 1/1,000,000,000. High-data-rate optical communication systems using On-Off Keying (OOK) or Differential Phase Shift Keying (DPSK) have only recently approached the theoretical performance limit.

It is known within the art to utilize a matched-filter receiver to maximize the SNR. One system, as disclosed by D. O. Caplan & W. A. Atia, "A quantum-limited optically-matched communication link," Optical Fiber Communication Conference and Exhibit 2001, vol. 1, Mar. 19, 2001, pp. MM2-1-MM2-3, using OOK was able to approach the theoretical limit for an optically preamplified OOK system by employing Return-to-Zero (RZ) OOK modulation and a matched optical filter. Previously, the system described by W. A. Atia & R. S. Bondurant, "Demonstration of return-to-zero signaling in both OOK and DPSK formats to improve receiver sensitivity in an optically preamplified receiver," LEOS '99 IEEE Lasers and Electro-Optics Society 1999 12th Annual Meeting, vol. 1, 1999, pp. 226-227, demonstrated that the use of return-to-zero (RZ) signaling results in improved receiver sensitivity when compared to the more widely used non-return-to-zero (NRZ) format for the case when non-ideal optical and electrical filters are used. Caplan & Atia were able to improve the receiver sensitivity even more, to approach the theoretical limit for an optically preamplified OOK system, by using a matched optical filter instead of a non-ideal optical filter. However, matched optical filters are custom components and lack ease of modification to match different waveforms. It is desirable to provide a system and method for optical communication that approaches the theoretical performance limit without requiring customized equipment.

D. O. Caplan & W. A. Atia, "A quantum-limited optically-matched communication link," Optical Fiber Communication Conference and Exhibit 2001, vol. 1, Mar. 19, 2001, pp. MM2-1-MM2-3, disclose a prior-art OOK matched-filter system, depicted in FIG. 1. As shown, there is a transmitter 10 and a receiver 20. The transmitter 10 consists of a laser 12, and a first Mach-Zehnder 14 that is sinusoidally driven to carve out return-to-zero (RZ) pulses. These pulses are subsequently modulated by a LiNbO3 Mach-Zehnder modulator 16 to encode 5 Gb/s non-return to zero (NRZ) data. The Mach-Zehnder modulator 16 is followed by a saturated erbium-doped fiber amplifier 13. The receiver 20 comprises a low-noise erbium-doped fiber amplifier 30 (EDFA) followed by an optional high-speed optical demultiplexer 27, a 0.1 nm Gaussian optical filter 28, a photodetector 29, and an error detector 26. There is also a power meter 25 to measure the power.

FIG. 2, as disclosed by Atia et al., depicts an optically preamplified DPSK system. The transmitter comprises a laser 34, a first modulator 36, and a second modulator 38, wherein the second modulator 38 is a data encoding modulator and is configured as a phase modulator. There is also a variable attenuator 40, a power meter 42, a pulse pattern generator 44, and a clock 46. The receiver 33 incorporates a erbium-doped fiber amplifier (EDFA) 48, a 26 GHz Fabry-Perot optical filter 50, a Mach-Zehnder demodulator with a 1-bit time delay interferometer 52 followed by a 10 GHz balanced detector. The error detector 54 is part of the measurement system which takes the place of the decision circuit or clock-and-data-recovery circuit of a practical system. If the Fabry-Perot optical filter were replaced by a matched optical filter, this system would represent a matched-filter system for DPSK. However, a matched filter may be a custom part which must be fabricated. Also known within the art are radar systems employing radio-frequency correlation receivers in lieu of radio-frequency matched filters. However, optical communications systems require optical implementations, such as the present invention.

As can be seen, there is a need for a high data rate optical communication system that approaches the theoretical performance limit and that may be re-configured for different waveforms without the need for custom optical filters. Also, an alternative means of approaching the theoretical performance limit allows choices which may prove easier to obtain or implement, or less costly.

SUMMARY OF THE INVENTION

These and other objects of the invention are accomplished in accordance with the principles of the present invention by an optical communication system and method that utilizes an optical modulator as an optical correlator in a receiver. To avoid confusion with other modulators used in other parts of the communication system, we use the term "correlation modulator" for the optical modulator used as an optical correlator in the receiver.

According to one aspect of the present invention, an optical communication system is disclosed comprising a transmitter in optical communication with a receiver, the receiver comprising an optical pre-amplifier in optical communication with a correlation modulator, a reference waveform generator in electrical communication with the correlation modulator, a photodetector in optical communication with the correlation modulator and in electrical communication with an electrical post-amplifier, and an electrical filter in electrical communication with the electrical post-amplifier. The reference waveform generator may consist of a clock with a time delay adjustment.

According to another aspect of the present invention, an optical communication system is disclosed, comprising an optical transmitter in optical communication with a receiver for differential phase shift keying. The receiver for differential phase shift keying may comprise an optical pre-amplifier in optical communication with a correlation modulator, a reference waveform generator in electrical communication with the correlation modulator, an interferometer in optical communication with the correlation modulator and dual photodetectors, an electrical post-amplifier in electrical communication with the dual photodetectors, and an electrical filter in electrical communication with the electrical post-amplifier. The reference waveform generator may consist of a clock with a time delay adjustment.

In yet another aspect of the present invention, an optical communication system is disclosed comprising an optical transmitter in optical communication with a receiver for on-off keying. The receiver for on-off keying may comprise an optical pre-amplifier in optical communication with a correlation modulator, a reference waveform generator in electrical communication with a correlation modulator, a photodetector in optical communication with the correlation modulator and in electrical communication with the electrical post-amplifier, an electrical filter in electrical communication with the electrical post-amplifier and a clock-and-data-recovery device. The reference waveform generator may consist of a clock with time delay adjustment.

According to yet another embodiment, an optical communication system for use within a satellite system is disclosed comprising an optical transmitter and a receiver for differential phase shift keying. The optical transmitter may have an optical source in optical communication with a data modulator, a binary data source in electrical communication with a clock and the data modulator, and a pulse-shaping modulator in optical communication with the data modulator and in electrical communication with a waveform generator. The waveform generator may be the clock. The receiver for differential phase shift keying may include an optical pre-amplifier in optical communication with a Mach-Zehnder correlation modulator, and a reference waveform generator in electrical communication with the Mach-Zehnder correlation modulator. The reference waveform generator may consist of a clock with a time delay adjustment. There may be a 1-Bit-Time-Delay interferometer in optical communication with the Mach-Zehnder correlation modulator and in optical communication with dual photodetectors, and an electrical post-amplifier in electrical communication with the dual photodetector and an electrical filter.

In still yet another aspect of the present invention, a method of transmitting an optical signal is disclosed comprising the steps of providing a pulsed signal from a transmitter; optically transmitting the pulsed signal to a receiver for differential phase shift keying; amplifying the pulsed signal through an amplifier; filtering noise out of the pulsed signal through a correlation modulator such as to maximize the signal-to-noise ratio; demodulating the pulsed signal to provide an electrical signal; boosting the electrical signal through an amplifier; filtering noise from the electrical signal through an electrical filter; and delivering the electrical signal.

According to another embodiment, a method of transmitting an optical signal is disclosed comprising the steps of: providing an optical carrier; encoding digital information from a binary data source on the optical carrier; modulating the optical carrier to provide a modulated signal; pulse-shaping the modulated signal to create a pulsed signal; transmitting the pulsed signal to a receiver; amplifying the pulsed signal through an amplifier; filtering noise out of the pulsed signal through a correlation modulator such as to maximize the signal-to-noise ratio; demodulating the pulsed signal through a detector to provide an electrical signal; boosting the electrical signal through an amplifier to provide a boosted electrical signal; filtering noise from the boosted electrical signal through an electrical filter; providing a clock-and-data-recovery device to measure the voltage of the boosted electrical signal so as to re-format and ensure proper delivery of an electrical signal comprising digital information; and delivering the electrical signal comprising digital information.

These and other features, aspects and advantages of the present invention will become better understood with reference to the following drawings, description and claims.

DETAILED DESCRIPTION OF THE INVENTION

Figure 1:
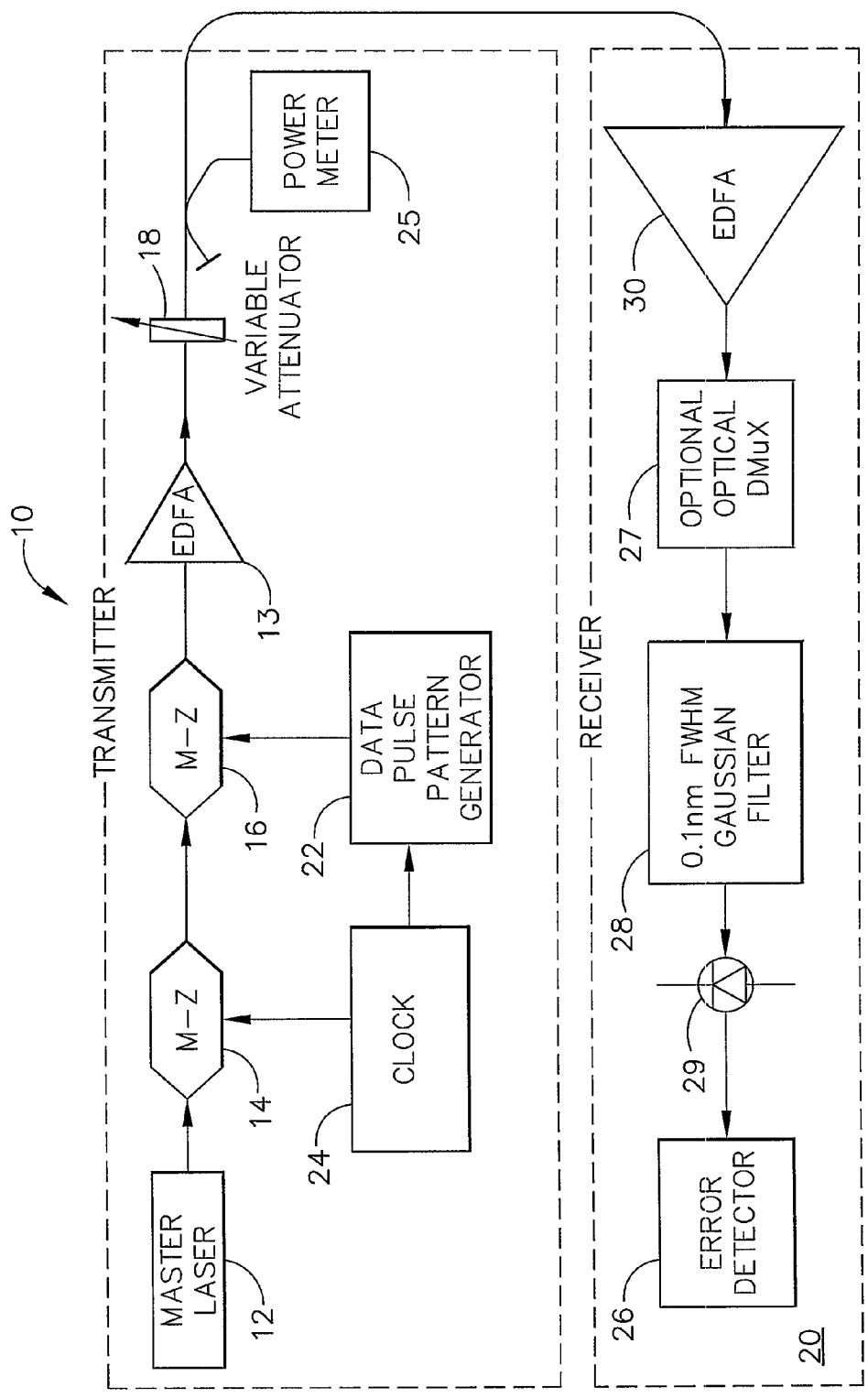
FIG. 1 depicts a schematic of a communication system according to the prior art.
Figure 2:
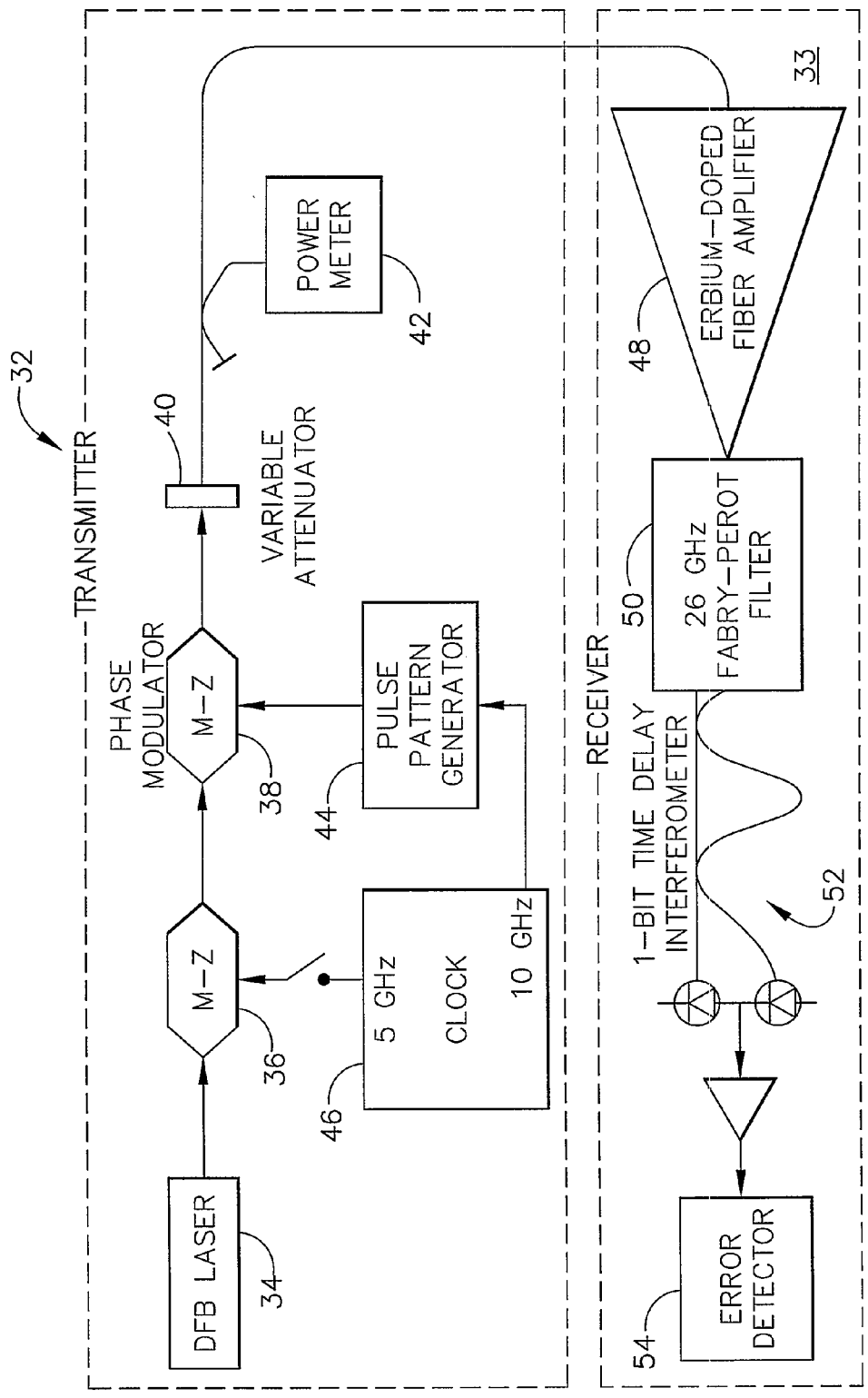
FIG. 2 depicts a schematic of another communication system according to the prior art.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention utilizes a data modulator in a transmitter, a pulse-shaping modulator, and a correlation modulator as an optical correlator in a receiver. The transmitter is in optical communication with the receiver. The receiver may comprise an optical pre-amplifier in optical communication with the correlation modulator, a reference waveform generator in electrical communication with the correlation modulator, a photodetector in optical communication with the correlation modulator and in electrical communication with an electrical post-amplifier, and an electrical filter in electrical communication with the electrical post-amplifier. The reference waveform generator may consist of a clock with a time delay adjustment. The electrical post-amplifier may act as both an amplifier and an electrical filter, or filtering may be performed by the component with another function which follows the post-amplifier.

The pulse-shaping modulator and the correlation modulator are driven by similar waveforms. The correlation modulator, when followed by a low-pass filter acting as an integrator, acts as a correlator, determining the correlation of a pulsed signal from the transmitter with that of a reference waveform at the receiver. The present invention may be used with an on-off data modulator in an On-Off Keying (OOK) system or a binary phase data modulator in a Differential Phase Shift Keying (DPSK) system. Note the use of 3 modulators in a typical system for binary data. A "data" modulator in the transmitter encodes binary digital data onto the optical carrier. Another "pulse-shaping" modulator in the transmitter pulses the optical carrier at the bit rate so each pulse representing a bit or binary digit has the desired shape. A third "correlation" modulator in the receiver is used to determine the correlation between a received waveform and a reference waveform or pulse shape. When the reference waveform or pulse shape in the receiver is the same as the pulse-shaping waveform applied in the transmitter, the receiver determines the correlation between the received waveform and the transmitted waveform, maximizing the sensitivity possible. Received waveforms which resemble the transmitted waveform or its negative will have a high positive or negative correlation; noise or spurious waveforms which do not resemble the transmitted waveform or its negative will have a small correlation. The result is a high-data-rate communication system and method that approaches the theoretical performance limit. With the same system, if the pulse-shaping waveform or the clock rate is changed, the system components need not be changed. By changing the reference waveform to match the pulse-shaping waveform, the same system can be used to approach the theoretical performance limit.

Figure 4:
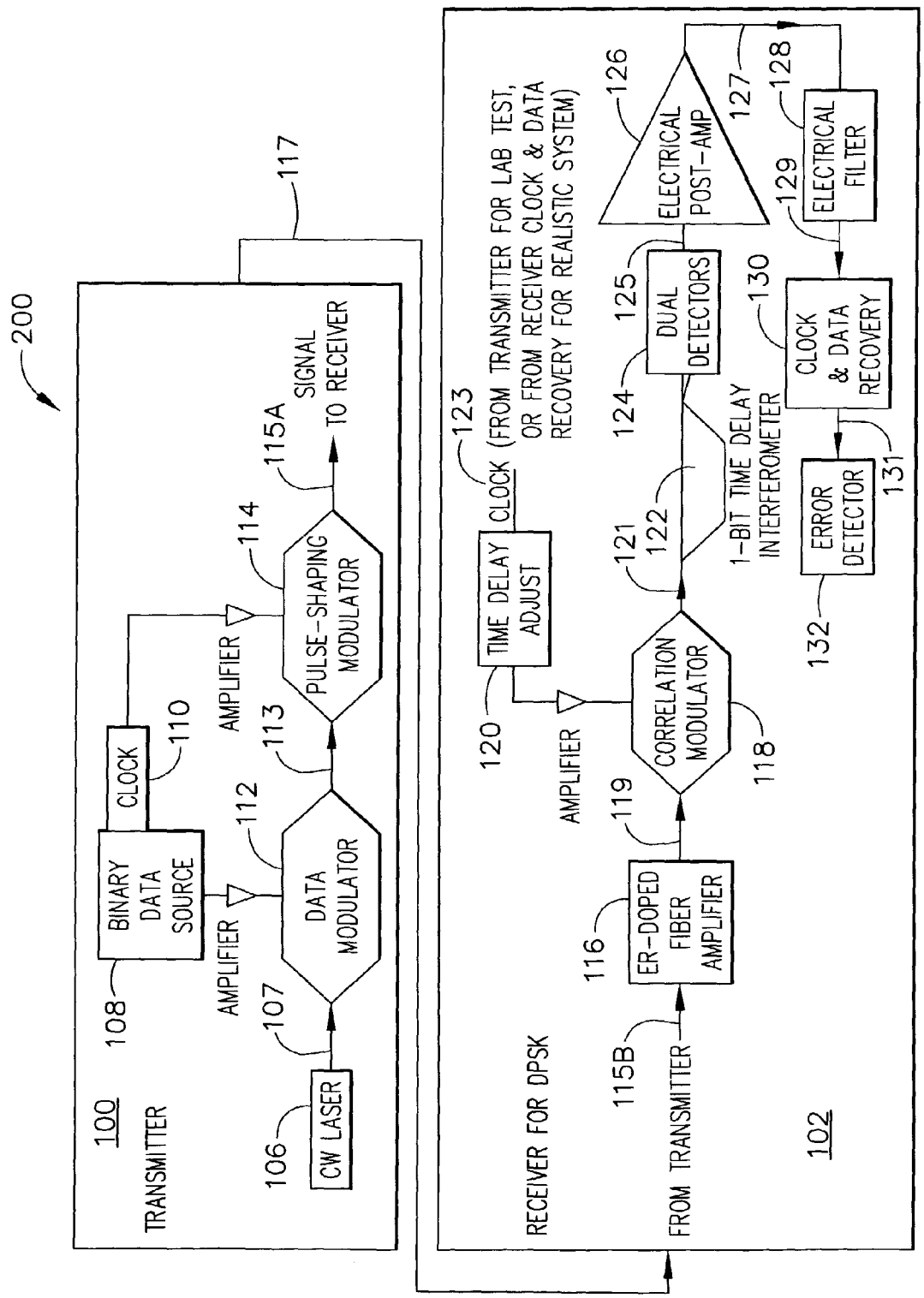
FIG. 4 depicts a schematic of an optical communication system according to the present invention.
Figure 5:
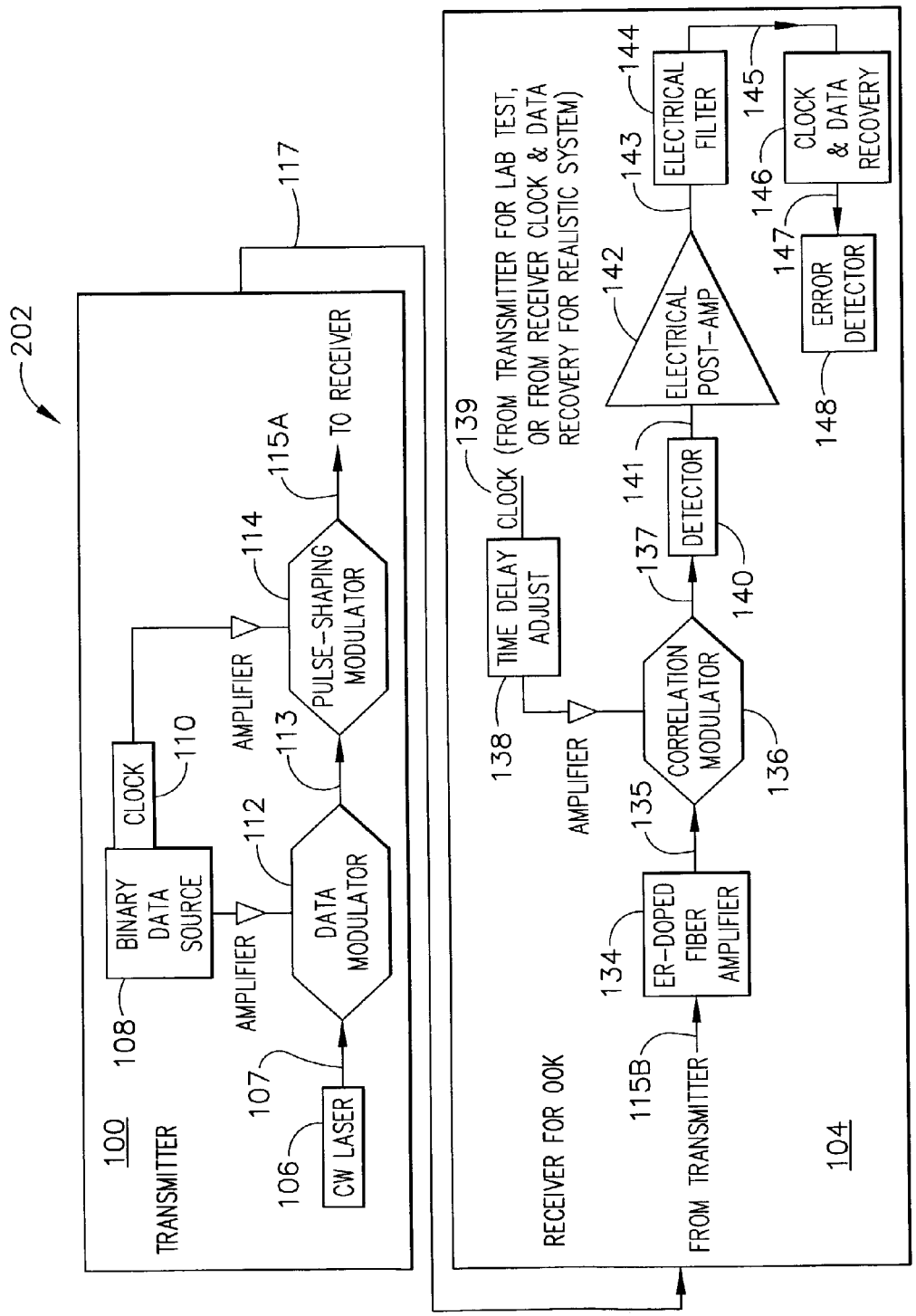
FIG. 5 depicts a schematic of an optical communication system according to another embodiment of the present invention.

Generally, the present invention envisions that each system, whether it is the DPSK system 200 or the OOK system 202 (as shown in FIG. 4 and FIG. 5), may have a data modulator in the transmitter, a pulse-shaping modulator in the transmitter, and a correlation modulator in the receiver. Each of these modulators serves as a multiplier. The correlation between a received optical signal waveform, such as a modulated optical carrier, and a reference waveform, is formed when the received optical waveform is multiplied by the reference waveform, and the product is integrated. The correlation modulator of the present invention acts as the multiplier and the electrical filter performs the integration. It should be noted that according to one embodiment, the electrical filter may be a low-pass "integrate-and-dump filter".

Figure 3:
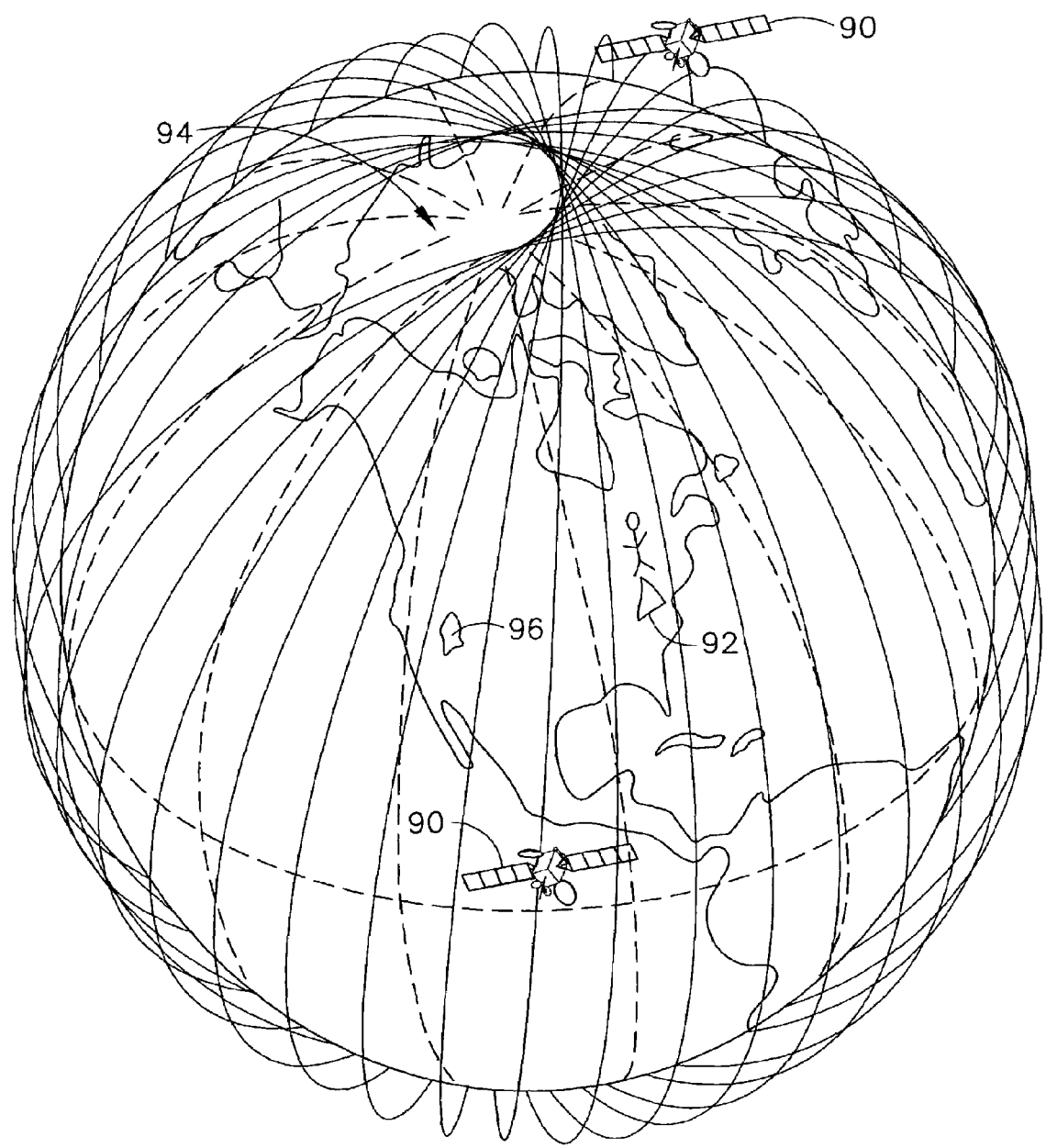
FIG. 3 depicts a schematic of a satellite communication system according to the present invention.

It is envisioned that the present invention may be utilized within a communication system, such as for a satellite. For example, as in FIG. 3, there may be a satellite 90 which may orbit the earth 94. A data source 92 may provide data to be transmitted. This data may be voice communication, documents, telecommunications, or any form of data known within the art. A transmitter, as further described below, may accept data from the data source 92 and deliver this information to a receiver, as further described below. In this embodiment, it is envisioned that the transmitter may be located on the satellite 90 or on earth 94. Also, a receiver may be located on the satellite 90 or on earth 94. Transmissions may be from a satellite to an earth station, from an earth station to a satellite, between two satellites, or between two stations on earth. The transmitter may be located with the data source 92 and may serve the function of encoding information from the data source into a modulation format which is used to modulate an optical carrier, and transmitting the information to the receiver. In turn, the receiver may deliver an electrical signal (which may consist of pulses representing binary digits) containing information from the data source 92 to a data recipient 96.

FIG. 4 depicts an optical communication system according to an embodiment of the present invention. As shown, there may be a transmitter 100 and a receiver 102 for differential phase shift keying (DPSK). The transmitter 100 may have a power output between 1 and 100 Watts (W), as an example, and comprise a continuous wavelength laser 106, data modulator 112, binary data source 108, transmitter clock 110, and pulse-shaping modulator 114. Data from the binary data source 108 may be amplified by amplifier 101. The data modulator 112 may act as a phase modulator for a DPSK system 200. There may be an optical power amplifier (not shown) between 115A and 115B when the power output is between 1 and 100 Watt. A signal 115A, which may consist of pulses with controlled phases, may travel from the transmitter 100 to the receiver 102 for DPSK by any transmission medium known within the art, such as a length of fiber, a transmitting and receiving telescope, a satellite communication system, or any other optical communication.

The receiver 102 may operate with received optical power levels between −50 and 0 decibels compared to 1 milliwatt (dBm), as an example. The laser 106 may act as a transmission carrier source. Data from a binary data source 108 may be encoded onto a signal carrier 107, which may be a laser beam and modulated by the data modulator 112 to provide a modulated signal 113. Modulation may be applied to an external modulator that impresses modulation on the previously unmodulated light (which may be signal carrier 107) from the laser 106. This is known as external modulation. The data modulator 112 may encode 10 Gigabits per second (Gbps) of data, as an example. This results in the modulated signal 113.

Next, the modulated signal 113 may be shaped by the pulse-shaping modulator 114 to provide a signal 115A, which will now consist of shaped pulses. The modulation may be applied to an external modulator that impresses pulse-shaping modulation on the light carrier. This is known as external modulation. The pulse-shaping modulation may, alternatively, be applied directly to the laser or light source to cause it to generate RZ pulses. This is known as direct modulation. The modulation may be sinusoidal. The modulation may also be of any shape known within the art, including a square wave. The order of the data modulator 112 and the pulse-shaping modulator 114 may be interchanged without significantly changing the performance of the system.

The signal 115A from the transmitter 100 should become the signal 115B into the receiver 102. It should be understood that the signal 115B likely contains noise which could resemble white Gaussian noise as an example. It is a goal of the system 200 to reduce the effect of this noise and minimize the generation of additional noise in the receiver. This may be accomplished by maximizing the ratio between receiver 102 signal power and noise power during each detection interval, which may correspond to the interval for each binary digit to be received. The timing of the signal power and noise power is determined according to the clock 110 and the delays in the system. The signal from the clock 110 may be amplified by amplifier 103. It is important that the timing be optimized to achieve the proper signal-to-noise ratio (SNR). The SNR may be between 0 and 100 dB, as an example. Small, short-term deviations from the optimal timing create what is known as timing jitter, and should be avoided. If left unchecked, especially in high data rate systems, it may accumulate so that a pulse may not optimally coincide with a detection interval. The clock 110, in combination with the pulse-shaping modulator 114, seeks to generate a signal 115B with well-defined pulses synchronized with the bit intervals.

A transmission medium 117 may be utilized to transmit the signal 115A from transmitter 100 to receiver 102. The transmission medium 117 may be a length of fiber, a transmitting and receiving telescope, a satellite communication system, or any other fiber communication means known within the art. Methods of transmitting optical signals are well known within the art and any method of delivering the signal 115A from the transmitter 100 to the receiver 102 and delivered as signal 115B is envisioned.

The receiver 102 for DPSK may comprise an optical pre-amplifier 116 (such as a low-noise Erbium-doped fiber amplifier), a correlation modulator 118, a time delay adjustment 120, amplifier, a clock 123, an interferometer 122, dual photodetectors 124, an electrical post-amplifier 126, an electrical filter 128, a clock-and-data-recovery device 130, and an optional error detector 132. During transmission from the transmitter 100 to the receiver 102, the optical signal 115B often is attenuated and requires amplification, and such amplification can be accomplished by the optical pre-amplifier 116, which may increase signal level from −40 to 5 dBm, as an example, to provide an amplified signal 119.

The correlation modulator 118 accepts the amplified signal 119. The correlation modulator 118 may be a lithium-niobate-based Mach-Zehnder modulator, or any other optical modulator driven by electrical input, such as electro-absorption modulators or polymer-based Mach-Zehnder modulators. The correlation modulator 118 and the time delay adjustment 120 can act together to ensure that the pulses of the optical signal 119 match and are synchronized with the reference pulses driving the correlation modulator 118, maximizing the transmission of signal during each pulse and minimizing transmission of noise between pulses. The receiver sensitivity may be close to theoretical limits, such as near 20 photons per bit for a pre-amplified DPSK system. The correlation modulator 118 provides a filtered signal 121 to the interferometer 122.

The interferometer 122 and dual photodetectors 124 may demodulate the filtered signal 121 to provide electrical signal 125. The interferometer 122 splits the signal into two paths, then recombines the signal from the two paths. One of the paths introduces a time delay compared to the other path; the time delay may be 1 bit period and such an interferometer would be called a 1-Bit-Time-Delay interferometer. The interferometer causes the signal from one bit interval to combine with the signal from a delayed bit interval in such a way that if the signals from both bit intervals are of the same polarity, optical power is sent to one of the dual photodetectors 124 but not the other, but if the signals from the two bit intervals are of opposite polarity, optical power is sent to the other one of the dual photodetectors. The photodetectors 124 may be 20 GHz photodetectors, as an example. The photodetector bandwidth usually exceeds the data rate of the system 200. By way of example, if the system 200 is used to transmit 10 Gb/sec, the photodetector bandwidth usually exceeds 10 GHz. The electrical post-amplifier 126 may once again amplify the electrical signal 125, so as to provide a boosted electrical signal 127. This may amplify the signal from 0.01 to 1 Volt, as an example.

The electrical filter 128 may then maximize the signal-to-noise ratio of the boosted electrical signal 127 to provide a filtered boosted electrical signal 129. The signal-to-noise ratio may be between 0 and 30 dB for instance. According to one embodiment, the electrical filter 128 may be an "integrate-and-dump" filter. The clock-and-data-recovery device 130 ensures the proper re-formatting and re-timing of the filtered boosted electrical signal 129 (and associated data, which may be from the data source 108) from the transmitter 100 to the receiver 102. Degradation of and jitter in the data waveforms may be removed by the clock-and-data-recovery device 130. The error detector 132 is an optional component and is generally utilized to test for any errors in the systems and methods according to the present invention. Generally, the receiver 102 may have a bit error rate (BER) between 1/1,000,000,000,000 and 1/1,000.

According to another aspect of the present invention, a method of transmitting an optical signal is disclosed which may utilize the systems as previously discussed and depicted with reference to FIG. 4. This method may include the step of providing an optical carrier source, which may be a laser 106, which produces an optical carrier 107, which may be a laser beam from laser 106. Digital information from a binary data source 108 may be encoded onto the signal 107 at a rate of 10 Gbit/s of data, for example. The signal 107 may be modulated by using a data modulator 112 to provide a modulated signal 113, wherein the modulated signal 113 comprises binary digits or bits. The modulated signal 113 may next be pulse-shaped through a pulse-shaping modulator 114 to create pulsed signal 115A with re-shaped pulses for each bit or binary digit. The pulsed signal 115A may be transmitted to a receiver 102 for differential phase shift keyed signals. The pulsed signal 115A may then be received as pulsed signal 115B in the receiver 102 for differential phase shift keyed signals 102; and the pulsed signal 115B may be amplified through a low-noise erbium-doped fiber amplifier 116 to provide an amplified signal 119. Noise may be filtered out of the amplified signal 119 through a correlation modulator 118 such as to maximize the signal-to-noise ratio and provide a filtered signal 121. A time delay adjustment 120 may adjust the correlation modulator 118. The filtered signal 121 may next be demodulated through an interferometer 122 and dual photodetectors 124 to provide an electrical signal 125 comprising bits or binary digits of the digital information. The method may also comprise the step of boosting the electrical signal 125 through an amplifier 126, to provide a boosted electrical signal 127. Next, the step of filtering noise from the boosted electrical signal 127 through an electrical filter 128 can occur to provide a filtered boosted electrical signal 129. A clock-and-data-recovery device 130 may be provided to measure the voltage of the filtered boosted electrical signal 129 so as to re-format and ensure proper delivery of the properly formatted electrical signal 129 containing digital information. Finally, the method may comprise the step of delivering the electrical signal 131 comprising digital information.

According to another embodiment, as depicted in FIG. 5, there may be a transmitter 100 and a receiver 104 for OOK. System 202 for On-Off Keying is modulated in an on and off manner, rather than in the phase, as in the previously discussed embodiment. The transmitter 100 may comprise a laser 106, data modulator 112, binary data source 108, clock 110 and pulse-shaping modulator 114. In an OOK system 202, the data modulator 112 acts as an on-off modulator. The signal 115A travels from the transmitter 100 to the receiver 104 to become signal 115B by any transmission medium 117 known within the art. Transmission mediums 117 may be a length of fiber, a transmitting and receiving telescope, a satellite communication system, or any other optical communication means known within the art. The receiver 104 may comprise an optical pre-amplifier 134, which may be a low-noise Erbium-Doped Fiber Amplifier (LNA or low-noise EDFA), a correlation modulator 136, a time delay adjustment 138, a photodetector 140, an electrical post-amplifier 142, an electrical filter 144, a clock-and-data-recovery device 146, and optionally an error detector 148. The optical pre-amplifier 134 may act to amplify the optical signal 115B transmitted from the transmitter 100 to the receiver 104 and provide an amplified signal 135. The correlation modulator 136 may be a lithium-niobate-based Mach-Zehnder modulator, or any other optical modulator driven by electrical input, such as electro-absorption modulators or polymer-based Mach-Zehnder modulators. The correlation modulator may provide a filtered signal 137 to the photodetector 140. The photodetector 140 may demodulate the filtered signal 137 to provide an electrical signal 141 to the post-amplifier 142. The electrical post-amplifier 142 may once again amplify the electrical signal 141 to provide boosted electrical signal 143. The amplification may be between 0.01 and 1 Volt as an example.

The electrical filter 144 can act to maximize the signal-to-noise ratio of the electrical signal 143 to provide filtered boosted electrical signal 145. The signal-to-noise ratios may be between 0 and 30 dB, for instance. According to one embodiment, the electrical filter 144 may be an "integrate-and-dump" filter. The clock-and-data-recovery device 146 ensures the proper re-formatting and re-timing of the electrical signal 145 (and associated data, from the data source 108) from the transmitter 100 to the receiver 104. Degradation of and jitter in the data waveforms may be removed by the clock-and-data-recovery device 146. The error detector 148 is an optional component and is generally utilized to test for any errors in the systems and methods according to the present invention.

According to another embodiment, a method of transmitting an optical signal is disclosed comprising the steps of: providing a signal, wherein the signal may be in the form of an optical carrier 107 from a laser 106; encoding digital information from a binary data source 108 onto the said optical carrier 107; modulating the optical carrier, using a data modulator 112, to provide a modulated signal 113 comprising bits or binary digits; pulse-shaping the modulated signal 113, using a pulse-shaping modulator 114, to create a pulsed signal for each bit of the modulated signal 113 to provide a signal 115A; transmitting the signal 115A to a receiver 104 for OOK; receiving a signal 115B in the receiver 104 for OOK; amplifying the signal 115B through a low-noise erbium doped fiber amplifier 134 to provide an amplified signal 135; filtering noise out of the amplified signal 135 through a correlation modulator 136 such as to maximize the signal-to-noise ratio and provide a filtered signal 137; demodulating the filtered signal 137 through a photodetector 140 to provide an electrical signal 141 comprising bits of digital information; boosting the electrical signal 141 through an amplifier 142 to provide a boosted electrical signal 143; filtering noise from the boosted electrical signal 143 through an electrical filter 144 to provide a filtered boosted electrical signal 145; providing a clock-and-data-recovery device 146 to measure the voltage of the filtered boosted electrical signal 145 so as to re-format and ensure proper delivery of the electrical signal 147 comprising digital information; and delivering the electrical signal 147 comprising digital information. There may also be the additional step of detecting errors, through the use of an error detector 148.

It should be understood, of course, that the foregoing relates to preferred embodiments of the invention and that modifications may be made without departing from the spirit and scope of the invention as set forth in the following claims.

We claim:

1. An optical communication system, comprising:
    a transmitter designed to transmit a transmitted waveform;
    an optical correlation receiver in optical communication with said transmitter, said optical correlation receiver comprising:
        an optical pre-amplifier which receives the transmitted waveform and generates an amplified waveform;
        a reference waveform generator which generates a reference waveform, wherein the reference waveform generator comprises a receiver clock with a time delay adjustment;
        a correlation modulator in optical communication with said optical pre-amplifier and in electrical communication with the reference waveform generator, wherein the time delay of the reference waveform sent to the correlation modulator is adjusted to maximize correlation of the amplified waveform with the time-adjusted reference waveform, wherein the correlation modulator receives the amplified waveform and the time-adjusted reference waveform, and multiplies the amplified waveform and the time-adjusted reference waveform to generate an improved signal based on the amplified waveform and the time-adjusted reference waveform, which can be filtered to maximize signal-to-noise ratio;
        a photodetector in optical communication with said correlation modulator, wherein the photodetector receives the improved signal and generates an electrical signal; and
        an electrical filter coupled to the photodetector designed to integrate the electrical signal and generate a filtered electrical signal having a maximized signal-to-noise ratio.

2. The system as in claim 1, wherein said transmitter comprises:
    an optical source, wherein said optical source is a laser;
    a data modulator in optical communication with said optical source;
    a binary data source in electrical communication with said data modulator;
    a transmitter clock in electrical communication with said binary data source;
    a pulse-shaping waveform generator in communication with said transmitter clock; and
    a pulse-shaping modulator in optical communication with said data modulator and in electrical communication with said pulse-shaping waveform generator.

3. The system as in claim 1, further comprising:
    a transmission medium in optical communication with said optical correlation receiver and said transmitter, wherein said transmission medium is selected from the group consisting of a fiber communication, a satellite communication, and a transmitting and receiving telescope.

4. The system as in claim 1, wherein said optical correlation receiver further comprises:
    an error detector in electrical communication with said optical correlation receiver.

5. The system as in claim 1, wherein said optical correlation receiver further comprises:
an electrical post-amplifier in electrical communication with said photodetector and in electrical communication with said electrical filter.

6. The system as in claim 5, wherein said optical correlation receiver further comprises:
a data recovery device in electrical communication with said receiver clock and said electrical filter.

7. The system as in claim 1, wherein said optical correlation receiver is for differential phase shift keying.

8. The system as in claim 7, wherein said optical correlation receiver further comprises:
an interferometer in digital communication with said correlation modulator.

9. The system as in claim 7, wherein said photodetector consists of dual photodetectors.

10. The system as in claim 1, wherein said optical correlation receiver is for on-off keying.

11. An optical communication system, comprising:
an optical transmitter designed to transmit a transmitted waveform;
an optical correlation receiver for differential phase shift keying in optical communication with said optical transmitter, said optical correlation receiver for differential phase shift keying comprises:
an optical pre-amplifier which receives the transmitted waveform and generates an amplified waveform;
a reference waveform generator which generates a reference waveform, wherein the reference waveform generator comprises a receiver clock with a time delay adjustment;
a correlation modulator in optical communication with said optical pre-amplifier and in electrical communication with the reference waveform generator, wherein the time delay of the reference waveform sent to the correlation modulator is adjusted to maximize correlation of the amplified waveform with the time-adjusted reference waveform, wherein the correlation modulator receives the amplified waveform and the time-adjusted reference waveform, and multiplies the amplified waveform and the time-adjusted reference waveform to generate an improved signal based on the amplified waveform and the reference waveform, which can be filtered to maximize signal-to-noise ratio;
an interferometer in optical communication with said correlation modulator;
dual photodetectors in optical communication with said interferometer, wherein the dual photodetectors receive the improved signal and generate an electrical signal;
an electrical post-amplifier in electrical communication with said dual photodetectors; and
an electrical filter in electrical communication with said electrical post-amplifier, said electrical filter designed to integrate the electrical signal and generate a filtered electrical signal having a maximized signal-to-noise ratio.

12. The system as in claim 11, wherein said optical correlation receiver further comprises:
a data recovery device in electrical communication with said electrical filter.

13. The system as in claim 11, wherein said optical transmitter comprises:
an optical source;
a data modulator in optical communication with said optical source;
a binary data source in electrical communication with said data modulator;
a transmitter clock in electrical communication with said data source;
a pulse-shaping waveform generator which is in communication with said transmitter clock; and
a pulse-shaping modulator in optical communication with said data modulator and said pulse-shaping waveform generator or transmitter clock.

14. The system as in claim 13, wherein said optical source is a laser.

15. The system as in claim 11, wherein said optical transmitter is characterized by a power between 1 W and 100 W.

16. The system as in claim 11, wherein said optical correlation receiver for differential phase shift keying is characterized by a received optical power between −50 and 0 dBm.

17. The system as in claim 11, wherein said correlation modulator is a Mach-Zehnder modulator.

18. The system as in claim 11, wherein said correlation modulator is an electro-absorption modulator.

19. The system as in claim 11, further comprising:
a transmission medium in optical communication with said transmitter and said optical correlation receiver.

20. The system as in claim 19, wherein said transmission medium is chosen from the group consisting of a fiber communication, a satellite communication, and a transmitting and receiving telescope.

21. An optical communication system, comprising:
an optical transmitter designed to transmit a transmitted waveform;
an optical correlation receiver for on-off keying, said optical correlation receiver for on-off keying being in optical communication with said transmitter, wherein said optical correlation receiver for on-off keying comprises:
an optical pre-amplifier which receives the transmitted waveform and generates an amplified waveform;
a reference waveform generator which generates a reference waveform, wherein the reference waveform generator comprises a receiver clock with a time delay adjustment;
a correlation modulator in optical communication with said optical pre-amplifier and in electrical communication with the reference waveform generator, wherein the time delay of the reference waveform sent to the correlation modulator is adjusted to maximize correlation of the amplified waveform with the time-adjusted reference waveform, wherein the correlation modulator receives the amplified waveform and the time-adjusted reference waveform, and multiplies the amplified waveform and the time-adjusted reference waveform to generate an improved signal based on the amplified waveform and the reference waveform, which can be filtered to maximize signal-to-noise ratio;
a photodetector in optical communication with said correlation modulator, wherein the photodetector receives the improved signal and generates an electrical signal;
an electrical post-amplifier in electrical communication with said photodetector; and
an electrical filter in electrical communication with said electrical post-amplifier, wherein said electrical filter is designed to integrate the electrical signal and generate a filtered electrical signal having a maximized signal-to-noise ratio.

22. The system as in claim 21, wherein said optical transmitter comprises:
an optical source;
a data modulator in optical communication with said optical source;
a binary data source in electrical communication with said data modulator;
a transmitter clock;
a pulse-shaping waveform generator which is in communication with said transmitter clock; and
a pulse-shaping modulator in optical communication with said data modulator and said pulse-shaping waveform generator or transmitter clock.

23. The system as in claim 22, wherein said optical source is a laser.

24. The system as in claim 21, wherein said optical transmitter is between 1 W and 100 W.

25. The system as in claim 21, wherein said optical correlation receiver operates with received optical power between −50 and 0 dBm.

26. The system as in claim 21, wherein said correlation modulator is a Mach-Zehnder modulator.

27. The system as in claim 21, wherein said correlation modulator is an electro-absorption modulator.

28. The system as in claim 21, further comprising:
a transmission medium in communication with said optical transmitter and said optical correlation receiver for on-off keying.

29. The system as in claim 28, wherein said transmission medium is selected from the group consisting of a fiber communication, a satellite communication, and a transmitting and receiving telescope.

30. A satellite communication system, comprising:
a satellite that includes an optical transmitter designed to transmit a transmitted waveform and an optical correlation receiver designed to receive the transmitted waveform;
said optical correlation receiver comprising:
an optical pre-amplifier which receives the transmitted waveform and generates an amplified waveform;
a reference waveform generator which generates a reference waveform, wherein the reference waveform generator comprises a receiver clock with a time delay adjustment;
a correlation modulator in optical communication with said optical pre-amplifier and in electrical communication with the reference waveform generator, wherein the time delay of the reference waveform sent to the correlation modulator is adjusted to maximize correlation of the amplified waveform with the time-adjusted reference waveform, wherein the correlation modulator receives the amplified waveform and the reference waveform, and multiplies the amplified waveform and the time-adjusted reference waveform to generate an improved signal based on the amplified waveform and the reference waveform, which can be filtered to maximize signal-to-noise ratio;
a photodetector in optical communication with said correlation modulator, wherein the photodetector receives the improved signal and generates an electrical signal; and
an electrical filter coupled to the photodetector designed to integrate the electrical signal and generate a filtered electrical signal having a maximized signal-to-noise ratio;
said transmitter comprising:
an optical source;
a data modulator in optical communication with said optical source;
a binary data source in electrical communication with said data modulator;
a transmitter clock in electrical communication with said data source;
a pulse-shaping waveform generator in communication with said transmitter clock; and
a pulse-shaping modulator in optical communication with said data modulator and in electrical communication with said pulse-shaping waveform generator or transmitter clock.

31. The system as in claim 30, wherein the optical correlation receiver further comprises:
a data recovery device in electrical communication with said electrical filter.

32. The system as in claim 30, wherein said transmitter is between 1 W and 100 W.

33. The system as in claim 30, wherein said optical correlation receiver operates with received optical power between −50 and −30 dBm.

34. A method comprising the steps of:
optically transmitting a transmitted waveform from a transmitter to an optical correlation receiver;
receiving said transmitted waveform and amplifying said transmitted waveform to generate an amplified waveform;
generating a reference waveform;
adjusting a time delay of the reference waveform sent to a correlation modulator to maximize correlation of the amplified waveform with the reference waveform;
providing the amplified waveform and the time-adjusted reference waveform to the correlation modulator, and multiplying the amplified waveform and the time-adjusted reference waveform via said correlation modulator to generate an improved signal, based on the amplified waveform and the time-adjusted reference waveform, which can be filtered to maximize signal-to-noise ratio;
demodulating said filtered signal to provide an electrical signal; and
delivering said electrical signal to an electrical filter coupled to the photodetector, and integrating the electrical signal to generate a filtered electrical signal having a maximized signal-to-noise ratio.

35. The method as in claim 34, wherein said step of optically transmitting said signal to said optical correlation receiver is for either differential phase shift keying or on-off keying.

36. The method as in claim 34, wherein said transmitted waveform from said transmitter is pulsed.

37. The method as in claim 34, wherein said step of optically transmitting said signal occurs at a power between 1 W and 100 W.

38. The method as in claim 34, wherein said step of filtering noise out of said signal provides a signal-to-noise ratio between 0 and 100 dB.

39. The method as in claim 34, further comprising the step of measuring a voltage of said electrical signal so as to ensure proper delivery of said electrical signal.

40. The method as in claim 34, further comprising the steps of:
    providing an optical carrier;
    encoding digital information from a binary data source onto said optical carrier;
    modulating said optical carrier to provide a modulated optical carrier, wherein said modulated optical carrier represents binary digits or bits; and
    pulse-shaping said modulated optical carrier to create a pulsed signal for each said bit of said modulated optical carrier; and
    transmitting said modulated optical carrier from said transmitter as said transmitted waveform.

41. The method as in claim 40 wherein said step of pulse-shaping said modulated optical carrier is performed according to a clock which determines the timing of the bits.

42. A method of comprising the steps of:
    providing an optical carrier;
    encoding digital information from a binary data source on said optical carrier;
    modulating said optical carrier to provide a modulated signal;
    pulse-shaping said modulated signal to create a pulsed signal;
    transmitting said pulsed signal to an optical correlation receiver;
    amplifying said pulsed signal through an amplifier to generate an amplified pulsed signal;
    generating a reference waveform;
    adjusting a time delay of the reference waveform sent to a correlation modulator to maximize correlation of the amplified pulsed signal with the reference waveform;
    providing the amplified pulsed signal and the reference waveform to the correlation modulator, and multiplying the amplified pulsed signal and the time-adjusted reference waveform via said correlation modulator to generate an improved signal which can be filtered to maximize signal-to-noise ratio;
    demodulating said improved signal through a detector to provide an electrical signal;
    boosting said electrical signal through an amplifier to provide a boosted electrical signal;
    filtering noise from said boosted electrical signal through an electrical filter and integrating said boosted electrical signal to generate a filtered boosted electrical signal having a maximized signal-to-noise ratio;
    providing a clock-and-data-recovery device to measure the voltage of said filtered boosted electrical signal so as to re-format and ensure proper delivery of an electrical signal comprising said digital information; and
    delivering said electrical signal comprising said digital information.

43. The method as in claim 42, wherein said step of pulse-shaping said modulated optical carrier is performed according to a clock which determines the timing of the bits.

44. The method as in claim 42, wherein said step of filtering noise out from said boosted electrical signal beam provides a signal-to-noise ratio between 0 and 100 dB.

45. The method as in claim 42, wherein said step of transmitting said pulsed signal occurs at a power between 1 W and 100 W.

46. The method as in claim 42, wherein said step of receiving said pulsed signal occurs at a received optical power between −50 and 0 dBm.

\* \* \* \* \*